July 23, 1963

S. L. CONTELLA 3,098,636

AUTOMOBILE RADIATOR CAP

Filed July 18, 1961

INVENTOR.
Samuel L. Contella,
BY
Bean, Brooks, Buckley & Bean
ATTORNEYS

United States Patent Office 3,098,636
Patented July 23, 1963

3,098,636
AUTOMOBILE RADIATOR CAP
Samuel L. Contella, Buffalo, N.Y.
(16 Maple Grove, Tonawanda, N.Y.)
Filed July 18, 1961, Ser. No. 124,999
4 Claims. (Cl. 251—98)

This invention relates to an automobile radiator cap and more particularly to a pressure relief operator therefor.

It is customary for automobile cooling systems to operate under pressure and this provides a dangerous condition to filling station attendants who may check a radiator to determine whether water should be added. On occasion the steam or hot water is, due to unrelieved pressure, forcefully ejected on the hands, arms and face of an attendant on rapid removal of the radiator cap, resulting in burns and other undesirable results.

An object of the present invention is to provide a radiator cap with a venting arrangement for relieving pressure prior to removal of the cap.

Another object of the invention is to provide a readily accessible venting operator that can be manipulated so that it will remain open without continued contact by the attendant.

A further object of the invention is to provide a venting arrangement that will be automatically closed upon opening rotation of the radiator cap.

A further object of the invention is to provide a simple venting unit that can be easily manufactured and assembled as part of an otherwise conventional radiator cap.

Other objects and features of the invention will more fully appear hereinafter.

Figure 1:
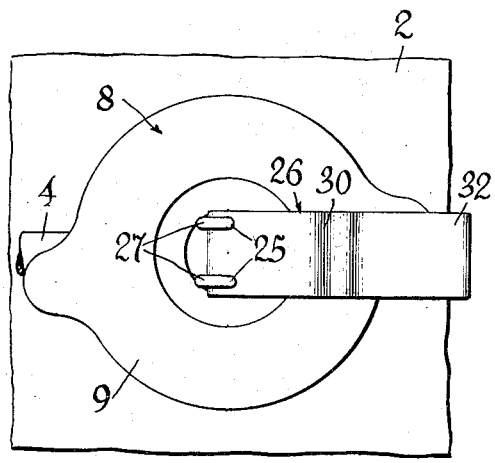
FIG. 1 is a plan view of a radiator cap incorporating my invention.
Figure 2:
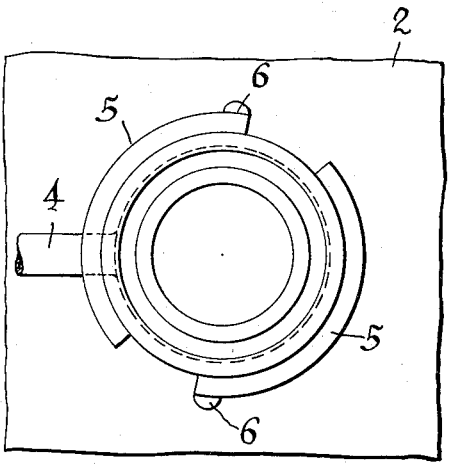
FIG. 2 is a plan view of a conventional automobile radiator neck.
Figure 3:
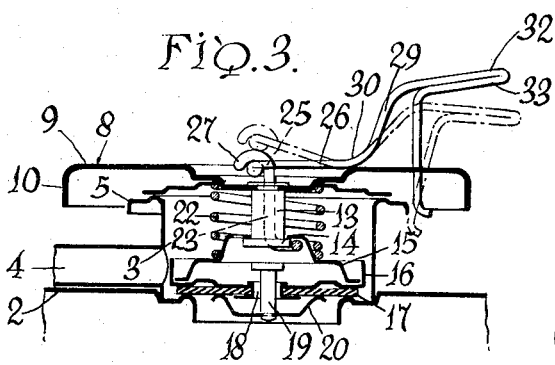
FIG. 3 is a sectional view of the cap and radiator neck showing the venting operator in its active and inactive positions.
Figure 6:
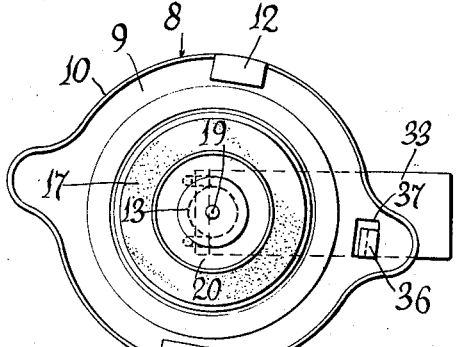
FIG. 6 is a plan view looking up at the underneath side of the cap.
Figure 4:
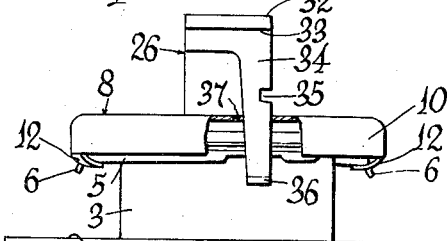
FIG. 4 is a side elevational view of the cap and radiator neck showing the venting operator in its inactive position with part of the cap broken away.
Figure 7:
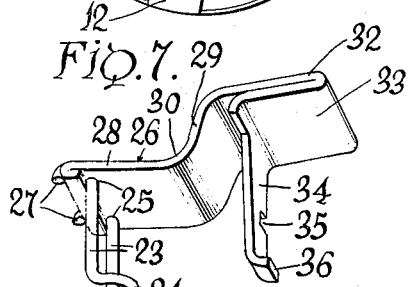
FIG. 7 is a perspective view of the vent operator as it would appear if not engaged with the cap.

The top 2 of the radiator shell is provided with an upstanding neck 3, a vent pipe 4, and spaced annular out-turned and down-turned shoulders 5 which are cam shaped and which terminate in out-turned stops 6. Shell 2 is provided with an annular valve seat 7. The entire radiator shell neck is a conventional commercial structure.

A radiator cap 8 for closing neck 2 has a top 9 and side wall 10. Wall 10 is provided with two inturned lugs 12 which, in the application of the cap to the neck, are adapted to pass down through the two openings between the ends of the spaced shoulders 5 and then, upon rotation of the cap in a clockwise direction, the lugs 12 ride on the cam surfaces of shoulders 5 and draw the cap down tight on the neck.

Cap 8 centrally supports a conventional pressure valve assembly which comprises a fixed pin 13 having an enlarged lower end 14 which supports an upper cup shaped member 15. A complemental lower cup shaped member 16 is attached to 15 and supports on its bottom a valve closure disk 17. Member 16 and closure 17 are provided with an aperture 18 to slidably receive a headed pin 19 which supports disk 20. The parts 17, 18, 19 and 20 constitute a vacuum relief valve assembly which is closed when an above atmospheric pressure exists in the radiator and opens by gravity when a sub-atmospheric pressure exists. The foregoing cups and attached parts comprise a valve unit.

A coil spring 22 surrounds pin 13 and bears against the bottom of top 9 of cap 8 and the top portion of member 15. Spring 22 exerts a predetermined pressure and thereby keeps valve closure disk 17 seated on valve seat 7 until such time as the pressure in the radiator exceeds the predetermined spring pressure. When the radiator pressure exceeds the spring pressure the valve closure 17 and cup parts 16 and 15 are forced upwardly, with the cup 15 sliding up on pin 13 and compressing spring 22, thereby permitting the steam or excess hot water to flow through the valve and out vent pipe 4, until such time as the excess pressure is relieved whereupon the spring pressure causes the valve to be reseated.

The structure or vent operator which comprises my addition to conventional practice will now be described.

I provide two apertures in top 9, one on each side of pin 13 to slidingly receive spaced wire legs 23 which are joined together at their lower ends by a semicircular portion 24 which surrounds one-half of the lower end 14 of pin 13 just under the bottom of the top portion of cup 15.

The upper ends of legs 23 extend upwardly through the two apertures in top 9 and through complemental apertures 25 formed in an actuating lever 26 to become a part of the lever, and are bent over at 27 to lock the legs and lever together.

Lever 26 has a substantially flat base portion 28 and an upturned intermediate portion 29 providing a fulcrum area 30 which is in contact with the top 9 to provide a pivot point. Lever 26 has an outwardly extending finger 32 formed with a rearward loop 33 and a downwardly extending finger leg 34. Leg 34 may be of substantially less width than the width of the main portion of lever 26 and tapered as shown.

Leg 34 is provided with a notch 35 and an out-turned lower end tip 36, and leg 34 is received in a rectangular aperture 37 formed in top 9. The arrangement of the lever and its three legs can be such that with manufacturing tolerances the lever can be twisted slightly to engage the notch 35 with the adjacent wall of the aperture 37.

If preferred the three apertures in the cap top, and the three legs can be aligned so that the notched edge of the finger leg is always biased toward the adjacent cap aperture wall so that when in registration the notch will automatically engage with the wall.

In operation when the attendant wants to check the level of water in a hot radiator he presses downwardly on finger 32 which slides leg 34 down in top aperture 37 until notch 35 registers with the adjacent edge of opening 37, when the biased condition of the parts will cause the notch and edge to engage. Pressing downwardly on finger 32 causes the lever to fulcrum about 30 raising the end of the lever and the attached legs 23 and their semicircular portion 24, which lifts the valve unit including valve disk 17, thereby venting the pressure in the radiator.

Figure 5:
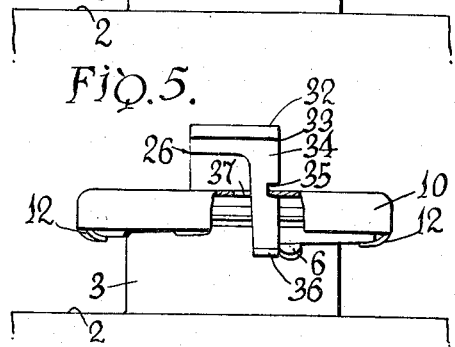
FIG. 5 is a view similar to FIG. 4 but showing the venting operator in its active position with the radiator neck and cap partially rotated.

After the radiator pressure has been relieved, the attendant can safely rotate the cap, and when rotated to a position where the end 36 of lever leg 34 comes into contact with one of the out-turned stops 6 on neck 3 (as shown in FIG. 5), further rotation causes leg 34 to remain still while the cap continues to turn, releasing the engagement between notch 35 and the adjacent edge of aperture 37, whereupon spring 22 will expand to close the valve and return the lever to its inactive position. In this condition of parts the cap can be lifted from the radiator neck.

With the construction described the attendant does not have to have his hand on the cap during all the time required to relieve the pressure, as the valve is locked open, but it is impossible to remove the cap without automatic unlocking so that the valve will assume its normal position.

It should be understood that my invention is not to be limited to the exact construction shown and described.

What is claimed is:

1. In combination with a radiator cap having a top, a retaining member depending from said top, a valve unit slidably received on said retaining member, and a resilient member acting between said top and said valve unit to urge the latter downwardly relative to said top, an actuating lever carried by said top for lifting said valve unit in opposition to said resilient member to thus effect a pressure-relieving action, said actuating lever having an elongate main body presenting a base portion at one end, a finger portion at the opposite end and a fulcrum portion joining the base and finger portions, a first leg member joined with said base portion remote from said fulcrum portion and depending therefrom through said cap and into engagement beneath a portion of said valve unit, said leg member being a length to normally position said base portion close to said upper surface of the cap under the action of said resilient member, and said actuating lever being so shaped as to simultaneously space said finger portion above said upper surface of the cap, a second leg member joined with said finger portion remote from said fulcrum portion and depending therefrom through said cap, whereby the first and second leg members guide and position said actuating lever relative to said cap.

2. The radiator cap construction of claim 1 further characterized by;

said second leg member having a notch in one edge portion, and said notch being normally positioned between the upper surface of the cap and the finger portion and adapted to detachably lock with the cap top upon movement of the finger portion toward said cap top.

3. The radiator cap construction of claim 1 further characterized by;

said second leg member having an out-turned end portion remote from said finger portion.

4. The radiator cap construction of claim 1 further characterized by;

said second leg member having a notch in one edge portion and said notch being normally positioned between the upper surface of the cap and the finger portion and adapted to detachably lock with the cap top upon movement of the finger portion toward said cap top, and said second leg member having an out-turned end portion below said cap top.

References Cited in the file of this patent

UNITED STATES PATENTS

| | | |
|---|---|---|
| 2,038,508 | Elliott | Apr. 21, 1936 |
| 2,792,964 | Reese et al. | May 21, 1957 |
| 2,944,699 | Oetiker | July 12, 1960 |
| 2,964,214 | Stannard | Dec. 13, 1960 |
| 2,990,971 | Errell | July 4, 1961 |